United States Patent Office 2,806,758
Patented Sept. 17, 1957

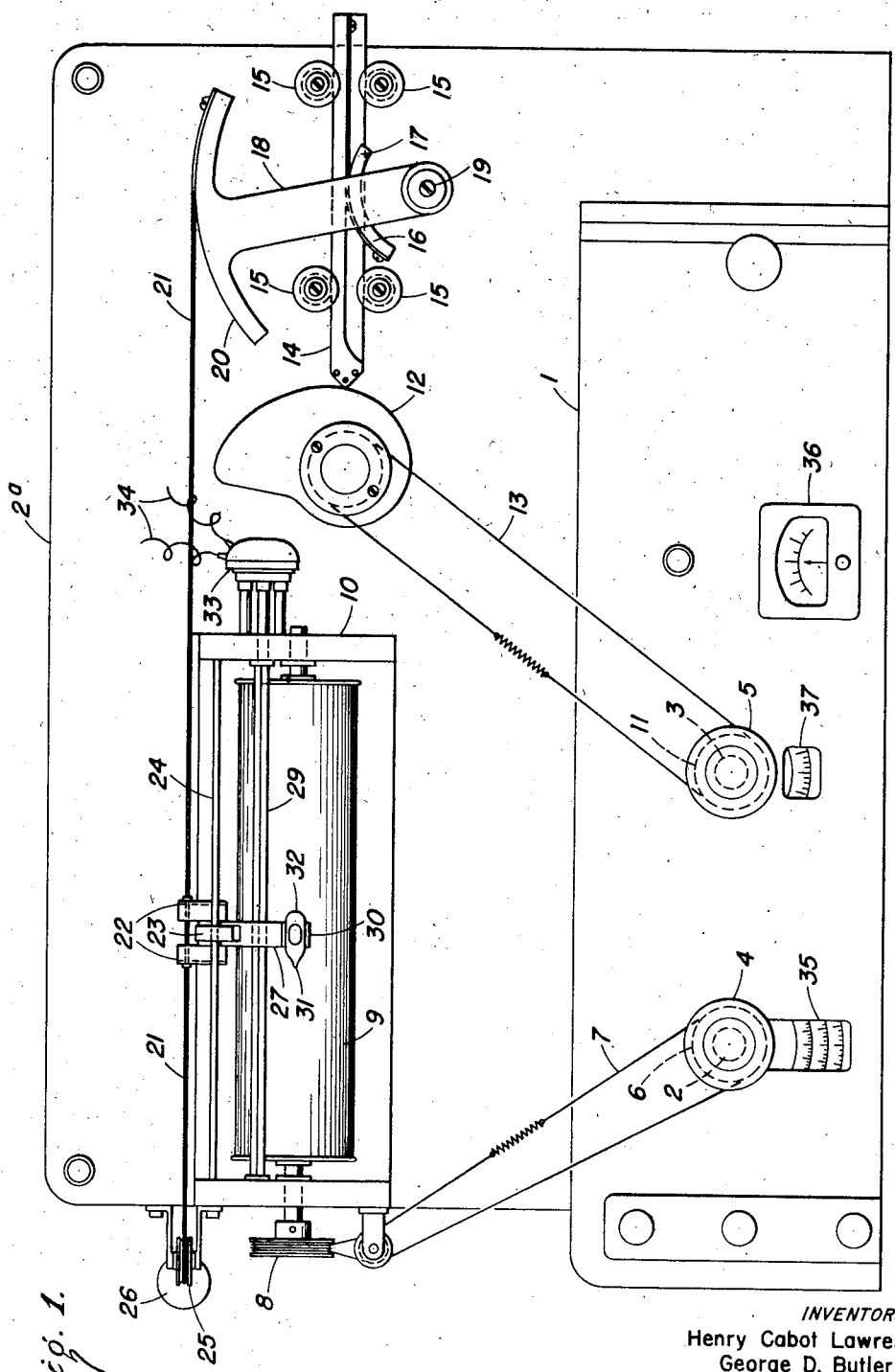

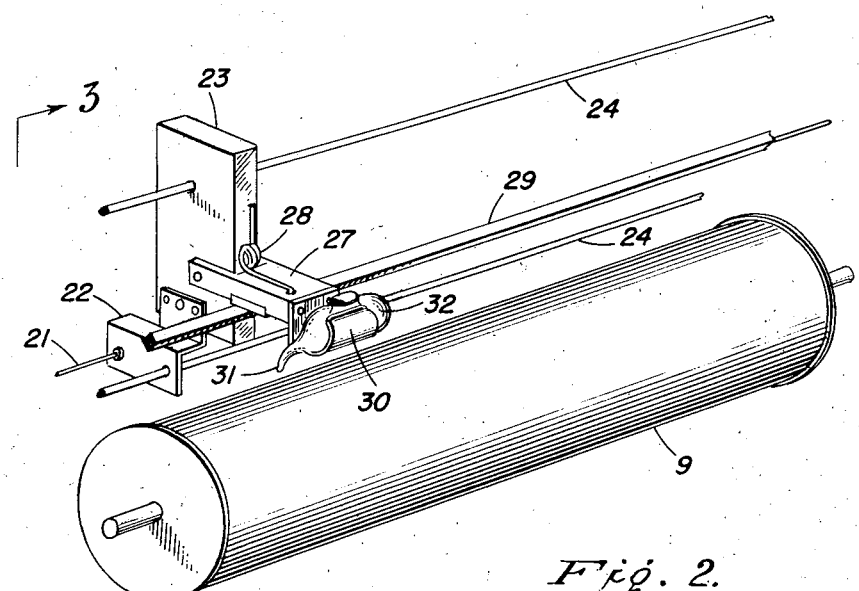
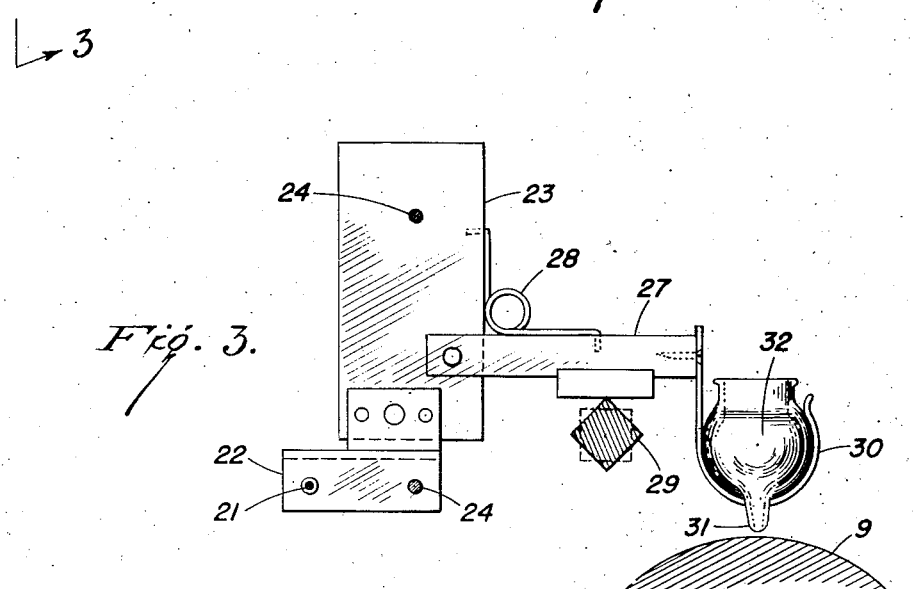

2,806,758

RECORDING U. V. SPECTROPHOTOMETER

George D. Butler, Martinsville, and Henry C. Lawrence, Ridgewood, N. J., assignors to American Cyanamid Company, New York, N. Y., a corporation of Maine Application November 10, 1953, Serial No. 391,219

8 Claims. (Cl. 346—112)

This invention relates to an improved recording spectrophotometer of the manual balance type and more particularly to an attachment adapted to be mounted on a Beckman DU spectrophotometer to provide for graphic recording of spectrophotometric data.

Manually balanced spectrophotometers have found extensive use, particularly spectrophotometers of the type put out by the Beckman Company under their designation DU. These manually balanced spectrophotometers have been sold in large quantities and are very effective compact units, particularly for work in the ultraviolet region for which they are particularly designed. Essentially the instrument comprises a source of light such as ultraviolet light, a manually operated monochromator, holders for samples and standard cells, single photoelectric detector, and a balancing potentiometer. In operation after inserting sample and standard, the monochromator is manually set successively, different wave lengths throughout the spectrum in which the data is desired, and the balancing potentiometer turned until the meter of the photoelectric detector registered zero. A dial driven by the balancing potentiometer carries a scale calibrating in percentage transmission of the sample. When it is desired to obtain spectrophotometric data over a considerable portion of the spectrum, it is necessary to set the instrument successively to a number of wave lengths which may be quite large if accuracy is desired, and in each wave length not only is the instrument manually balanced but the percentage transmission has to be recorded by hand for each point, and later on a curve is manually drawn from the data that is obtained. This involves a great deal of manual labor; the possibilities for error are doubled because it is necessary both to set the potentiometer to balance at each point and also to read, record, and plot the percentage transmission shown by the dial. The time is long, and the possibility of human error greatly increased.

Another disadvantage in the ordinary type of Beckman DU spectrophotometer lies in the fact that the data is obtained in the form of percentage transmission of a sample. This data is of interest and directly useful only where the concentration of material having selective spectral absorption in the sample is known. Otherwise a curve is obtained which cannot be used for graphical identification because the shape of the curve changes with the concentration of absorbing material in the sample, for spectral absorption follows Beers' law, and the light transmitted through the sample is proportional to the intensity of the beam striking the sample multiplied by $e^{-kcl}$. The factor $l$ which is cell length can be eliminated by using a constant cell length, but this still leaves percentage transmission affected by the specific absorption $k$ and by the concentration of absorbing material in the cell, both of these quantities appearing in the exponent of $e$. Therefore, the shape of the curve plotted will vary with changes in concentration and cannot be used for identification purposes unless the concentration of the sample is actually known.

There are functions of the transmission which will give curves invariant in shape with changes in concentration, for example, if the function plotted is log log $l/T$, the shape of the curve obtained does not change with concentration, the only effect of changes in concentration being to move the curve bodily up or down. It is, of course, possible to compute for each reading of percentage transmission obtained on the Beckman instrument the value of the function log log $l/T$ and if this is done, a curve can be obtained which is invariant in shape with concentration. However, the computational time is so enormous that the cost of obtaining such curves from the manual instrument is prohibitive. It is also sometimes desirable for certain problems to obtain data in terms of optical density which is the log $l/T$. Here again the data may be computed from the readings of the manual machines, but even though the operation is not as time-consuming as the computation of the function log log $l/T$, it still takes so long a time as to be impractical except for very special problems. Another serious drawback to the special functions obtained from the manual machine by computation is the additional possibility for human error involved in the numerous computations which in the case of some curves may amount to as many as a hundred for a single curve.

The present invention removes all of the drawbacks to obtaining graphical data from the ordinary Beckman spectrophotometer. It makes it possible to record curves of log log $l/T$, log $l/T$, or any other function of transmission which is desired. No computations are involved as the recording is entirely automatic. Time is enormously reduced for producing even simple percentage transmission curves and is reduced to an even greater extent in the case of curves requiring computation. Curves of special functions such as log log $l/T$ are obtained with the same speed as ordinary percentage transmission curves and with much more speed than can be achieved by the manual plotting which is necessary in the ordinary Beckman spectrophotometer, even when transmission percentage curves are drawn. Essentially the present invention is obtained by an attachment which is rigidly connected to a Beckman spectrophotometer and carries a recording platen or other surface moved by the wave length drive of a monochromator, for example a platen which is rotated through a suitable cable drive from the monochromator drive knob and secondly, the device for moving a recording pen at right angles over the recording surface which is driven from the knob or shaft of the balancing potentiometer. As soon as balance is obtained, means are provided for momentarily depressing the recording pen so that a dot is recorded on the recording surface. The dot is produced instantaneously, preferably by electrically actuated means such as a push button solenoid, and thus a curve composed of a series of dots is automatically recorded as fast as the spectrophotometer can be set to the desired wave length and adjusted to balance. The speed is very much greater than that required for reading the percent transmission from the balancing potentiometer and manually drawing a curve, and no possibility of human error in either reading the balancing potentiometer dial or in plotting results because the setting of the pen is automatically determined by the position of the balancing potentiometer shaft. Also as will be described below, it is possible to record any suitable function such as log log $l/T$ with the same speed as an ordinary transmission curve and with a substantial saving in time and a decreased possibility for human error.

When percent transmission is desired, the movement of the pen over the recording surface is made proportional to the rotation of the balancing potentiometer shaft. In other words, the drive between shaft and pen is a linear drive; though, of course, normally the movement of the pen will be very much greater than the movement of the periphery of the shaft, in other words, drives using cables and pulleys and the like will require the use of pulleys of suitable size to produce the desired linear relationships between potentiometer position and pen position. When it is desired to record not percentage transmission but a special function thereof, such as log log $l/T$, it is then necessary to use a variable ratio drive between the balancing potentiometer and the recording pen. Ordinarily such variable ratio drives are most easily effected by the use of suitable cams and cam followers. These constitute the preferred form of variable ratio drive. The invention, of course, is not concerned with the particular details of this drive but broadly can employ any suitable variable ratio drive which has the correct ratio variation.

One of the problems presented by the instrument of the present invention is that of back lash. The measurements on the spectrophotometer and their record in a series of dots forming a curve on suitable recording sheets are both quite precise, and if the information recorded is to be of value, in many cases it must be very accurate. This presents a rather serious problem in variable drive ratio design, for the movement of the pen is quite great. Ordinarily a recording sheet of letter size is employed, and the pen travel may have to amount to 8 inches or more. Back lash in the variable ratio drive must be kept to a minimum, but at the same time, since the setting of the balancing potentiometer is effected manually, the drive must not be too stiff, as otherwise the operator will tire and danger of slippage or stretching of drive cables is increased. When an ordinary cam is used as a variable ratio drive, means must be provided to maintain the cam follower in close, firm contact with the profile of the cam. Ordinary spring returns are not suitable because, with the extreme length of travel of the pen, an ordinary spring which exerts sufficient tension on the cam follower at one end of the pen travel will be too loose and permit back lash at the other end, and if made tight enough to eliminate back lash, then excessive tension will be noted at the first end of the pen travel with concomitant, unduly stiff operation of the spectrophotometer balancing potentiometer.

This difficult problem has been solved by several modifications of the present invention. Where the instrument does not have to be semiportable, it is possible to use a cable and weight to maintain firm contact of cam follower and the cam, the weight of course, applies the same tension at all points of pen travel. For permanent installations this is quite satisfactory and makes a simple device. However, if it is desired to move the spectrophotometer with its attachments, the cable and weight is very awkward.

There is available a new type of spring called a nega'tor spring which exerts an almost constant pull, regardless of extension. This spring is in the form of a coiled steel tape preformed so that when addressed it forms a very tightly coiled spiral. When unwound the tension is a result of straightening out a small part of the spring where it unwinds and changes from the wound form to a straight extension. This is substantially a constant tension, regardless of how much the spring is unwound. Such springs are ideally suited for a compact and more portable instrument. The springs are described in an article in the September 1952 issue of the magazine "Instruments," page 1274.

When various types of cams are used as a variable ratio drive, it is possible to choose the function of transmission to be recorded, for example a number of different cams may be provided, for example one to plot percentage transmission, another to plot optical density, and a third to plot log log $l/T$, and the desired cam placed on the shaft. It is also possible to place a plurality of cams on the same shaft and provide for shifting the shaft axially at a point where all of the cams have the same radius. Such methods of successively engaging different cams are well known in the art, and any suitable design may be employed. Shifting from cam to cam by movement of the shaft is simple in ordinary profile cams, but the same result may be obtained by actually removing the cam from the shaft and replacing it with a different one. This removal and replacement is such a rapid operation that the loss in time is small. Also in practical operation usually a large series of curves are plotted of the same function so that it is not necessary to shift cams for nearly every curve.

The wave length drive from the monochromator adjusting shaft can be effected in several general ways. The drive may be a linear drive so that the rotation of the platen or the movement of the recording surface, if a different form of surface is used, is proportional to monochromator shaft setting. In such an event it will be necessary to use a recording paper with a nonuniform wave length scale because the change in wave length of the monochromator in a Beckman instrument, as in most instruments employing conventional monochromators, is not proportional to shaft rotation. The linear drive may be such that one rotation of the monochromator shaft will produce one rotation of the platen. In such a case with the ordinary Beckman instrument, a single sheet of paper will not record the whole of the spectrum, as ordinarily this requires somewhat more than two rotations of the monochromator setting shaft. Where it is desired to record the whole spectrum on a single sheet of paper, pulleys and cables on the platen shaft and monochromator adjusting shaft may be of different diameters so that one rotation of the platen corresponds to the whole spectrum being investigated. It is also possible at will to change the pulleys or other drive elements which will change the wave length scale, permitting an enlarged scale of a part of the spectrum where the problems to be investigated require measurements restricted only to this portion of the spectrum. In every case, however, where there is a linear drive from the monochromator setting shaft to the recording surface, paper with a nonlinear wave length scale will have to be used. If it is desired to have the wave length scale uniform, it is necessary to introduce a suitable varying ratio drive between the monochromator adjusting shaft and the prism positioning arm in the monochromator.

It is an advantage of the present invention that it can be made as an attachment on which a Beckman spectrophotometer can be clamped and requires only the application of driving pulleys to the monochromator and balancing potentiometer shafts. This does not require disassembling the spectrophotometer and can be affected by relatively unskilled personnel. Also it is possible quickly and easily to detach the drives of the present invention from the spectrophotometer or detach the spectrophotometer from the recording attachment framework and use the spectrophotometer in the normal way. This permits considerable additional flexibility; however, it is rare to find a problem in which the automatic recording of the data which is made possible by the present invention is not the most advantageous way of using the spectrophotometer.

Invention will be described in greater detail in conjunction with the drawings in which:

Fig. 1 is a plan view of a Beckman spectrophotometer with automatic recording attachment;

Fig. 2 is a perspective on an enlarged scale of a recording drum and recorder pen;

Fig. 3 is a vertical section along the line 3—3 of Fig. 2;

Figure 4:
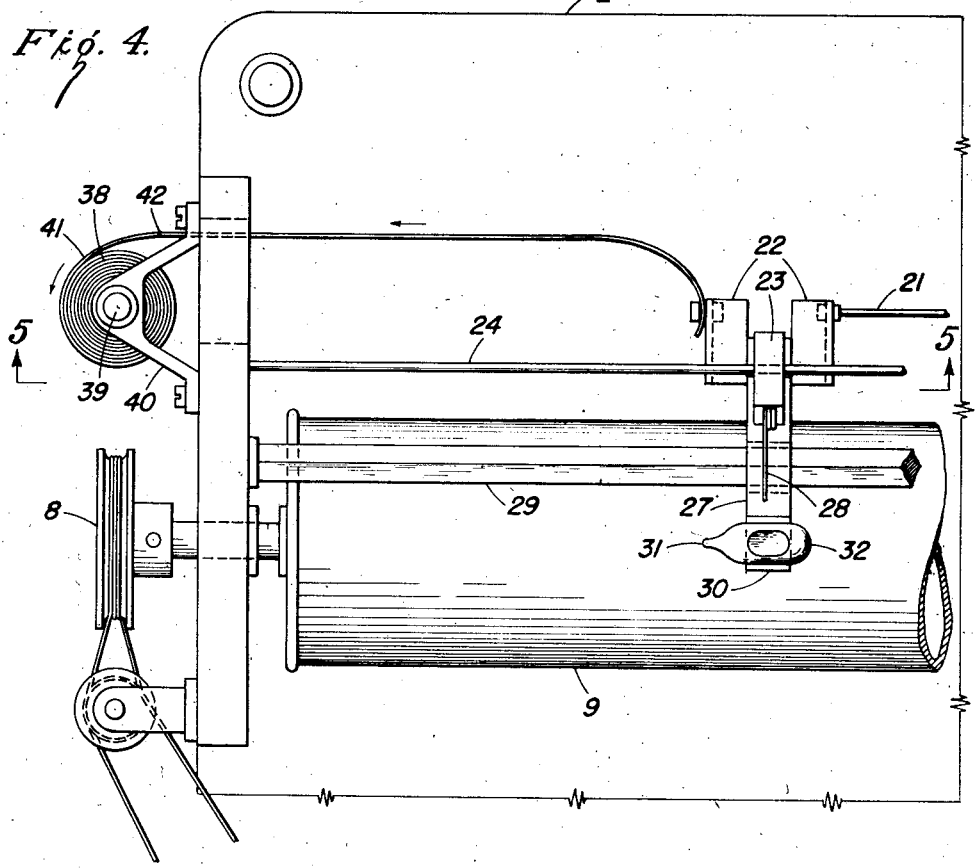
Fig. 4 is a plan view of a portion of the recording drum and recording pen using a spring tensioning means.

Fig. 1 shows a Beckman spectrophotometer 1 which is clamped to a plate 2a on which the recording mechanism of the present invention is mounted. The spectrophotometer is provided with a conventional wave length drive shaft 2 and balancing potentiometer drive shaft 3, both of which are manually actuated by the knobs 4 and 5 respectively. On the wave length drive shaft 2, there is mounted a pulley 6 which drives through a spring tensioned positive cable drive 7, a pulley 8 on the drive shaft of a recording drum or platen 9, which is carried by a framework 10. The drum is adapted to receive a sheet of recording paper (not shown).

The balancing potentiometer drive shaft 3 has mounted on it a pulley 11 which drives the cam 12 through a spring tensioned positive cable drive 13. The cam drives a cam follower 14 which moves between two pairs of rollers 15. A thin steel tape 16 is attached to the end of the cam follower and runs over a circular segment 17 of a crank 18 being fastened to one end of the segment.

The crank 18 is journaled on a pivot 19 and carries at its extremity a second and larger circular segment 20. To this there is attached a cable 21 which is attached to one of a pair of brackets 22 on a movable carriage 23. The carriage moves on two guide rods 24 and is shown in greater detail in Figures 2 and 3. The cable 21 extends from the brackets 22 over a pulley 25 to a weight 26. The weight places a uniform tension on the cable 21, and hence through the crank 18 and tape 16 maintains the cam follower 14 in firm contact with the profile of the cam 12.

On the carriage 23 there is hinged a plate 27 which is forced by the spring 28 to ride on the square shaft 29, (Figs. 2 and 3). At the end of the hinged plate 27, there is a clip 30 which carries the recording pen 31 and its ink reservoir 32. The shaft 29 extends into a rotary solenoid 33 from which wires 34 extend to a button actuated switch (not shown). Normally the plate 27 rides on an edge of the square shaft 29, as is shown in full lines in Fig. 3. When, however, the solenoid 33 is actuated, it rotates the shaft rapidly through 90° causing the hinged plate 27 to drop on a flat surface of the rod 24, as shown in dotted lines in Fig. 3, and then is raised during the latter half of the 90° rotation onto the next edge of the square shaft 24. As a result, the pen 31 momentarily drops into contact with the paper on the drum 9 and registers a dot thereon.

The operation of the spectrophotometer and its recording attachment proceeds as follows. The Beckman spectrophotometer is operated in its normal manner, that is to say a sample, the transmission of which is to be measured, is placed in the instrument and the wave length drive shaft is turned to one end of the spectrum or to the portion of the spectrum in which measurements are to be made. The particular wave length appears on the wave length scale shown through the window 35, and this results in turning the drum 9 so that the paper will be positioned with its wave length abscissa opposite the pen 31. In the ordinary Beckman spectrophotometer the wave length drive shaft rotates through more than one revolution to accommodate the full spectrum of ultraviolet and visible light through which it is possible to operate the machine. When an enlarged record of a smaller part of the total spectrum is desired, the pulleys 6 and 8 will be of the same size and suitably printed paper employed on the drum 9. Where it is desired to record transmission measurements through the whole of the available spectrum or through a portion which is larger than that covered by one revolution of a wave length drive shaft, a smaller pulley 6 or a larger pulley 8 are used so that the drum 9 will make one for more than one revolution of the wave length drive shaft 2.

When the spectrophotometer has been set for the desired wave length, for example at one edge of the spectrum to be investigated, the balance potentiometer knob 5 is turned until the meter 36 indicates balance. The potentiometer scale 37 is visible through a window and is usually calibrated in percent transmission. The cable drive 13 drives the cam 12 in proportion to transmission, and the cam follower 14 is moved in proportion to the profile of the cam 12 which is shown in the form for plotting the function log log $l/T$. The movement of the cable 21 and with it the pen 31 is proportional to the movement of the cam follower 14. At the point of balance the switch actuating the rotary solenoid 33 is closed. The shaft 29 turns rapidly through a quarter turn and the pen 31 records a dot on the paper. The travel of the pen having been proportional to log log $l/T$, recorded dot represents this function at the particular wave length.

The spectrophotometer wave length drive shaft is then turned to the next wave length, the potentiometer turned to balance, the solenoid 33 actuated, and another dot is recorded at the new wave length. This procedure is repeated through the spectrum or the portion of the spectrum to be investigated and the dots on the recording paper define a curve of the transmission function determined by the profile of cam 12. Each measurement is accurate for there is no back lash in the cable 21, and the wave length investigated can be so chosen that the recorded dots will constitute the desired curve. If a different function for example transmission percentage is desired, a different cam 12 is used. In the latter case the profile of the cam will have the equation in polar coordinates of $\rho = \theta$.

Figure 5:
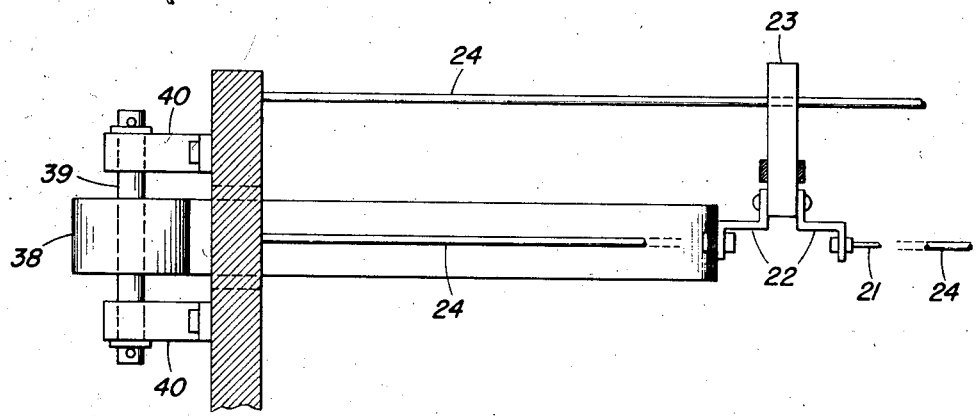
Fig. 5 is a vertical section along the line 5—5 of Fig. 4.

Figures 4 and 5 show in modification of the tensioning means on the cam follower. The same parts will be given the same reference numerals as in Figs. 1 to 3. In Figures 4 and 5, instead of carrying the cable 21 on to a weight 26 as in Fig. 1, the rear bracket 22 is attached to the end of a nega'tor spring 38 which is mounted on a journal 39 on which it freely turns, the latter being attached to the plate 2 by a pair of brackets 40. The spring is in the form of a steel tape preset so that in its relaxed position it is tightly wound, as the cam follower 14 moves and pulls along with it the carriage 23 straightening the spring between the points 41 and 42 (Fig. 4). As the length of this portion does not change materially as the spring is unwound when the carriage 23 moves to the right, the tension on the cable 21 is practically uniform. The operation of the device is of course the same as that described in connection with the modification shown in Figs. 1 to 3.

We claim:

1. A recording spectrophotometer comprising in combination a framework, a manually balanced spectrophotometer including a manually operated monochromator drive and balancing potentiometer attached to said framework, a recording means including a recording surface attached to said framework in predetermined alignment with the spectrophotometer, mechanism for moving the recording surface, driving means connecting the mechanism with the monochromator drive, said means causing the recording surface to move in one direction in proportion to a predetermined function of the monochromator drive setting, a marking element, means for moving said element over the recording surface but out of contact therewith in a direction at right angles to the movement of the surface, said means moving the marking element in proportion to a predetermined function of spectrophotometer balance potentiometer setting, and means for depressing the marking element to touch the recording surface.

2. A device according to claim 1 in which the recording surface is a platen adapted to receive therearound a recording paper, said platen being rotated by movement of the monochromator drive.

3. A device according to claim 2 in which the drive of the marking element from balance potentiometer includes a cam and cam follower.

4. A device according to claim 3 in which the cam and cam follower constitute a drive of the recording element, the cam being connected to the balanced potentiometer shaft to rotate in proportion therewith, the profile of the cam being such that the movement of the recording element is proportional to log log of the reciprocal of balance potentiometer shaft setting.

5. A device according to claim 1 in which the marking element is a pen mounted on a hinged plate, movable along the edge of a squared shaft; and means are provided for momentarily rotating the squared shaft through 90°.

6. A device according to claim 5 in which the means for rotating the squared shaft is a rotary solenoid.

7. A device according to claim 1 in which the recording surface is a platen rotated in accordance with monochromator setting adapted to carry therearound a recording paper, the marking element is a pen movable axially along the platen, said pen being mounted on a plate hinged in a framework movable axially above the platen, said hinged plate riding on an edge of a squared shaft, electrical means for momentarily rotating the squared shaft to 90° whereby the pen momentarily is brought in contact with the recording paper, a cam and cam follower, the cam being driven from the balance potentiometer shaft, a crank movable by the cam follower and in proportion to the travel thereof, cable connections from said crank to the framework carrying the pen to move said framework in proportion to cam follower travel and means for maintaining the cam follower in close contact with the profile of the cam.

8. A device according to claim 7 in which the means for maintaining the cam follower in contact with the cam profile is a spiral spring attached to the framework moving the pen being characterized by a relaxed state constituting a tightly wound spiral, said spiral being mounted to turn freely whereby movement of the pen carrying framework in a direction to unwind the spring results in a substantially constant tension on the cable connections.

References Cited in the file of this patent

UNITED STATES PATENTS

| | | |
|---|---|---|
| 2,147,668 | Pfeiffer | Feb. 21, 1939 |
| 2,221,950 | Moore | Nov. 19, 1940 |
| 2,328,293 | Pineo | Aug. 31, 1943 |
| 2,329,657 | Shurcliff | Sept. 14, 1943 |
| 2,376,311 | Hood | May 15, 1945 |
| 2,400,828 | Keinath | May 21, 1946 |
| 2,714,834 | Patterson et al. | Aug. 9, 1955 |